(12) United States Patent
Nickolov et al.

(10) Patent No.: US 7,661,065 B2
(45) Date of Patent: Feb. 9, 2010

(54) SYSTEMS AND METHODS THAT FACILITATE IMPROVED DISPLAY OF ELECTRONIC DOCUMENTS

(75) Inventors: Radoslav Petrov Nickolov, Bellevue, WA (US); Kumar H. Chellapilla, Sammamish, WA (US); David M. Bargeron, Seattle, WA (US); Patrice Y. Simard, Bellevue, WA (US); Paul A. Viola, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 11/135,717

(22) Filed: May 24, 2005

(65) Prior Publication Data

US 2006/0271846 A1    Nov. 30, 2006

(51) Int. Cl.
*G06F 17/00* (2006.01)
(52) U.S. Cl. .................................. 715/273; 715/240
(58) Field of Classification Search .......... 715/273–277
See application file for complete search history.

(56) References Cited

U.S. PATENT DOCUMENTS

| | | | | |
|---|---|---|---|---|
| 5,001,697 A * | 3/1991 | Torres | | 715/202 |
| 5,634,064 A * | 5/1997 | Warnock et al. | | 715/208 |
| 5,943,679 A * | 8/1999 | Niles et al. | | 715/247 |
| 6,825,849 B1 * | 11/2004 | Minakuchi et al. | | 345/581 |
| 6,981,040 B1 * | 12/2005 | Konig et al. | | 709/224 |
| 7,047,490 B1 * | 5/2006 | Markovic et al. | | 715/234 |
| 7,085,999 B2 * | 8/2006 | Maeda et al. | | 715/236 |
| 7,127,673 B2 * | 10/2006 | Iwata et al. | | 715/209 |
| 7,293,243 B1 * | 11/2007 | Ben-Shachar et al. | | 715/781 |
| 7,548,239 B2 * | 6/2009 | Hill et al. | | 345/428 |
| 7,565,623 B2 * | 7/2009 | Beam et al. | | 715/810 |
| 7,577,923 B2 * | 8/2009 | Beam et al. | | 715/840 |
| 2002/0109687 A1 * | 8/2002 | Ishii et al. | | 345/472.2 |
| 2003/0014445 A1 * | 1/2003 | Formanek et al. | | 707/526 |
| 2005/0091604 A1 * | 4/2005 | Davis | | 715/772 |
| 2006/0026513 A1 * | 2/2006 | Eschbach et al. | | 715/526 |
| 2007/0055931 A1 * | 3/2007 | Zaima et al. | | 715/526 |
| 2007/0061755 A1 * | 3/2007 | Taboada et al. | | 715/818 |

* cited by examiner

*Primary Examiner*—Doug Hutton
*Assistant Examiner*—Benjamin J Smith
(74) *Attorney, Agent, or Firm*—Lyon & Harr, LLP; Richard T. Lyon

(57) ABSTRACT

A computer-implemented word processing system comprises an interface component that receives a features vector associated with an electronic document. An analysis component communicatively coupled to the interface component analyzes the features vector and determines a viewing mode in which to display the electronic document. In accordance with one aspect of the subject invention, the viewing mode can be one of a conventional viewing mode and a viewing mode associated with enhanced readability.

18 Claims, 13 Drawing Sheets

SYSTEMS AND METHODS THAT FACILITATE IMPROVED DISPLAY OF ELECTRONIC DOCUMENTS

TECHNICAL FIELD

The subject invention relates generally to display of electronic documents, and more particularly to systems and methods that facilitate determining whether an electronic document can be displayed in a specialized reading format.

BACKGROUND OF THE INVENTION

Advancements in networking and computing technologies has enabled transformation of computers from low performance/high cost devices capable of performing basic word processing and computing basic mathematical computations to high performance/low cost machines that are capable of a myriad of disparate functions. For example, a consumer level computing device can be employed to aid a user in paying bills, tracking expenses, communicating nearly instantaneously with friends or family across large distances by way of email, obtaining information from networked data repositories, and numerous other functions/activities. Computers and peripherals associated therewith have thus become a staple in modern society, utilized for both personal and business activities.

In particular, word processing applications have become important tools for generating, formatting, and disseminating electronic documents. For centuries human beings were forced to communicate in writing by way of a marking instrument and a writing surface, such as pen and piece of paper. Writing in long hand is a tedious process that requires a substantial amount of time and effort, particularly for generating lengthy documents. For instance, one can hardly imagine generating a novel of three hundred pages by long hand. As time passed, typewriters became available to mitigate some of the deficiencies associated with long hand writing. For example, one highly skilled in typing can type words at a rate that is much faster in comparison to a rate of writing in long hand. Typewriters, however, are bulky and unappealing to the eye, making them unsuitable for many locations. Further, errors made while typing by way of a typewriter are difficult to correct, and often appear unkempt to a reader thereof. Therefore, in some instances, entire pages must be rewritten, thereby adversely affecting efficiency and causing a typist to harbor angst against the machine. Other difficulties with typewriters include lack of disparate fonts, type size, type feature (such as italics), thereby not fully realizing aesthetic features that can be associated with documents.

Word processors resident on today's computers mitigate several of the deficiencies associated with writing long hand and type writers. For instance, modern computers are designed to be sleek and pleasing to the eye, thereby allowing placement of such computing devices in substantially any area within a home or business. Further, today's word processors have included therein a myriad of font styles, features, bullet options, spacing options, and numerous other options that enable creation of a customized electronic document that meets innate aesthetic requirements of the creator of such document. Word processors also include functionality that aids in assisting an author in spelling, grammar, and the like. Thus, today's word processors include benefits of typewriters as well as several other functionalities to aid in electronic document creation.

While word processors have become powerful tools for document creation and editing, there remain issues with respect to reviewing such documents on computer screens. For example, it can be difficult to read text on a computer screen. Users who read a significant amount of text on computer screens can be subject to eye strain, which results in headaches and can decrease reading speed as well as reading comprehension. To improve readability of electronic documents, some word processing systems have included functionality that displays documents on a computer specifically for reading and reviewing. In particular, font size and page layout can be altered to enhance readability, and technology that renders text so that is appears to have heightened clarity is employed to further aid in reading and reviewing electronic documents. While this functionality aids in readability, problematic issues remain. More particularly, in conventional word processing systems, each document (regardless of document structure) is subject to the functionality, as a "one size fits all" approach is employed. Accordingly, in some instances, readability of documents subject to the aforementioned functionality is negatively affected rather than positively affected. Users of the word processing system can change views so that the electronic document appears in a conventional manner, and thereafter print such document and make any edits by hand. This forced alteration, however, can negatively impact goodwill associated with a word processing system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to selection of a viewing mode in which to graphically render an electronic document. For instance, viewing modes can be designed to offer enhanced readability with respect to electronic documents displayed upon computer screens. Such reading modes, however, can utilize a "one size fits all" approach, and attempt to graphically render each document within the viewing mode regardless of format of the electronic documents. In many instances, however, such an approach results in a sub-optimal and/or insufficient graphical rendering of the electronic document. The subject invention enables automatic selection of a viewing mode within which to graphically render the electronic document, wherein a viewing mode selected is a best viewing mode for the electronic document when compared to other available viewing modes.

In accordance with one aspect of the subject invention, a classifier can be trained by way of providing such classifier with a plurality of electronic documents that have been reviewed by annotators. For instance, the annotators can indicate a viewing mode from amongst a plurality of viewing modes in which each of the electronic documents is optimally viewed (in comparison to the other available viewing modes). In more detail, annotators can review electronic documents in disparate viewing modes, and select which viewing mode that best displays each of the electronic documents. Furthermore, the annotators can indicate particular features that are undesirably displayed within each of the viewing modes (e.g., a fifth line is not displayed properly). From such annotations, the classifier can determine which characteristics/features/ data associated with the electronic document can be problematic with respect to rendering the electronic document in disparate viewing modes.

After training, individual electronic documents can be analyzed and best available viewing modes in which to render the electronic documents can be automatically selected. Data associated with an electronic document can be employed to populate a features vector, wherein data therein can be utilized to determine a viewing mode in which to graphically render the electronic document. In accordance with one aspect of the subject invention, the electronic document need not be graphically rendered when determining a viewing mode in which to render the electronic document. For instance, a number of tab spaces within a line, font size, and the like can be utilized within the features vector. Based upon data within the features vector, a viewing mode to utilize in connection with the electronic document can be automatically selected.

In accordance with another aspect of the subject invention, a user can provide feedback with respect to a viewing mode utilized in connection with an electronic document. For example, a viewing mode can be automatically selected for a particular electronic document, and the user can desire that it be displayed within a disparate viewing mode. The user can provide feedback relating to such desires. Based upon the feedback, a different viewing mode can subsequently be selected, and a component utilized for undertaking automatic selection of viewing modes can be updated. Furthermore, the viewing mode can depend upon parameters associated with a device upon which the electronic document is to be rendered. For instance, viewing modes can display differently on different screens (e.g., disparate screen sizes, resolution, DPI, and the like). These device parameters can be analyzed and considered when determining a viewing mode in which to graphically render the electronic document.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
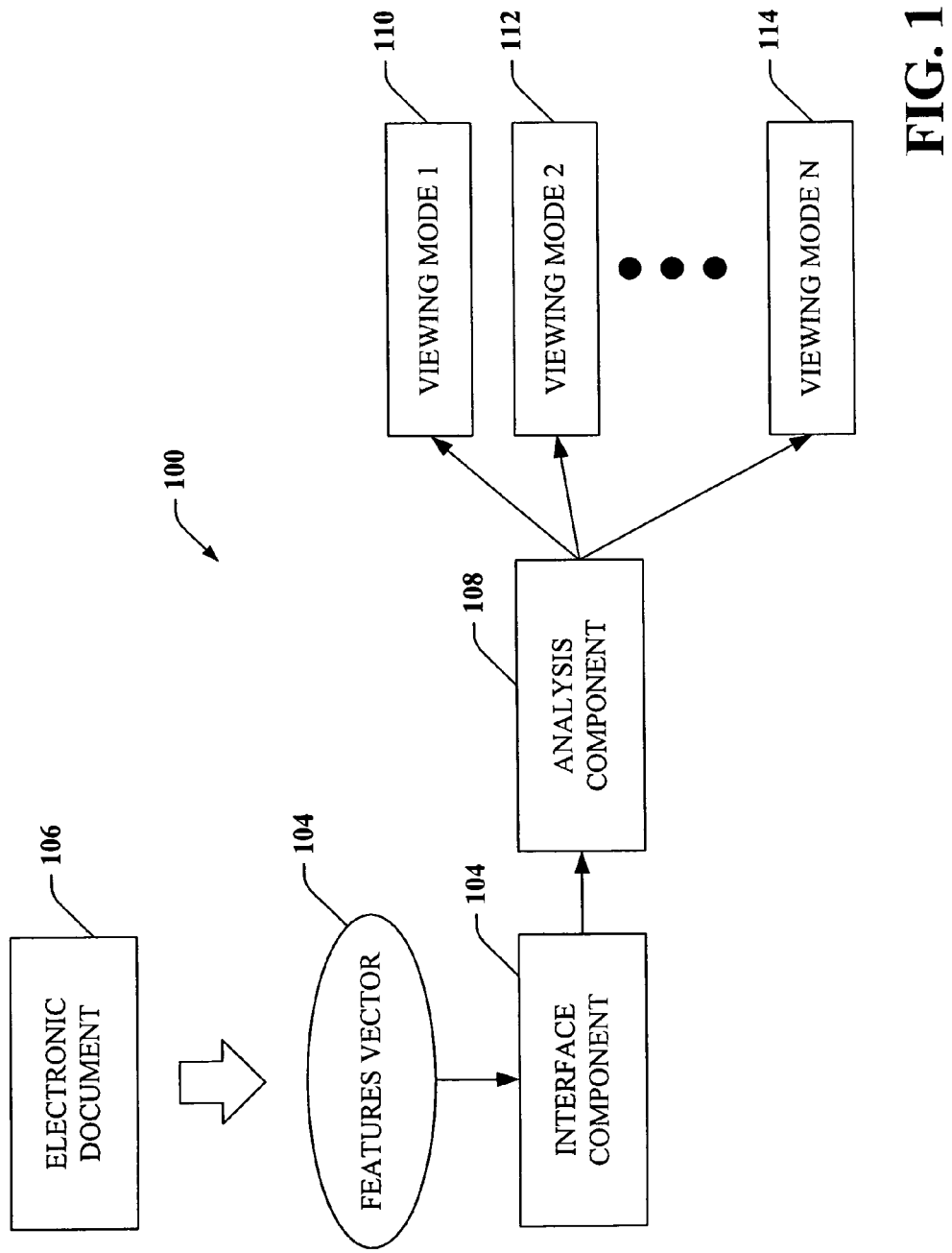
FIG. 1 is a high-level block diagram of a system that facilitates automatic selection of a viewing mode in which to graphically render an electronic document in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

The subject invention will now be described with respect to the drawings, where like numerals represent like elements throughout. The subject invention generally relates to novel systems, methods, articles of manufacture, and/or apparatuses that facilitate viewing of an electronic document in a view mode that is best suited for readability and/or review of such electronic document. Now referring to FIG. 1, a system 100 that facilitates display of an electronic document in a viewing mode that provides for optimal view of the electronic document compared to disparate available viewing modes. For example, a first viewing mode can be a best available viewing mode for a document of one structure, and disparate viewing mode can be a best available viewing mode for a document of a different structure or including disparate data. The system 100 includes an interface component 102 that receives a features vector 104 relating to an electronic document 106. In accordance with an aspect of the subject invention, the features vector can include characteristics that can be found within data associated with the electronic document 106 (e.g., the electronic document 106 need not be visually rendered prior to creation of the features vector 104). Thus, information such as number of tabs within certain lines, font style, font size, and the like can be included within the features vector 104 without requiring graphically rendering the electronic document 106.

An analysis component 108 is communicatively coupled to the interface component 102 and can be employed to select a viewing mode from a plurality of viewing modes 110-114 based at least in part upon an analysis of the features vector 104. For example, the analysis component 108 can detect that one or more characteristics within the features vector 104 are associated with one or more of the viewing modes 110-114 and positively or negatively affect readability with respect to one or more of such viewing modes 110-114. For instance, a particular number of tabs in certain lines can negatively affect readability in the viewing mode 110, while not impacting readability in the viewing mode 112 or 114. Accordingly, the features vector 104 can include sufficient data to enable the analysis component 108 to determine a viewing mode in which to display the electronic document 106.

In accordance with one aspect of the subject invention, the analysis component 108 can be subject to training by way of a classifier produced by machine learning techniques such as boosting, neural networks, SVMs etc., thereby enabling selection of a viewing mode within a word processing system. In a specific example, annotators can be provided with electronic documents that are displayed in disparate viewing modes, and such annotators can determine whether the electronic documents are associated with sufficient readability within the viewing modes. Furthermore, the annotators can rank viewing modes with respect to an electronic document. For instance, electronic documents can be displayed to the annotator in three disparate viewing modes, and the annotator can rank the viewing modes from one to three with respect to each of the electronic documents. Moreover, the annotators can specify particular readability issues with respect to viewing modes that do not provide sufficient readability. For example, the annotators can indicate particular portions of electronic documents within disparate viewing modes that are associated with undesirable readability. In a more specific example, the annotators can indicate that particular fonts do not display desirably in a certain viewing mode, can indicate that spacing is undesirable in a viewing mode, and/or any other suitable annotation.

Such annotations can be attached to the electronic document together with any other suitable data added by the annotators, and thereafter provided to a classifier. Given a sufficient number of electronic documents and annotations associated with disparate viewing modes, particular characteristics and/or data associated with electronic documents that affect readability within the viewing modes 110-114 can be determined. Accordingly, the features vector 104 can include such characteristics and/or data, and the analysis component 108 can analyze such data to determine which of the viewing modes 110-114 to employ in connection with graphically rendering the electronic document 106.

In accordance with another aspect of the subject invention, the analysis component 108 can be updated by way of a service provider over any suitable network. For instance, an updating component (not shown) can be utilized to receive updates from an owner of a word processing system or other suitable service provider. In more detail, a service provider may provide a word processing system with additional viewing modes—accordingly, the analysis component 108 can be updated to contemplate such additional viewing modes. Furthermore, the system 100 can be updated to include disparate or additional data/characteristics within the features vector 104. Thus, any suitable updating that can be provided by a service provider can be received by an updating component and the system 100 can be updated accordingly.

Figure 2:
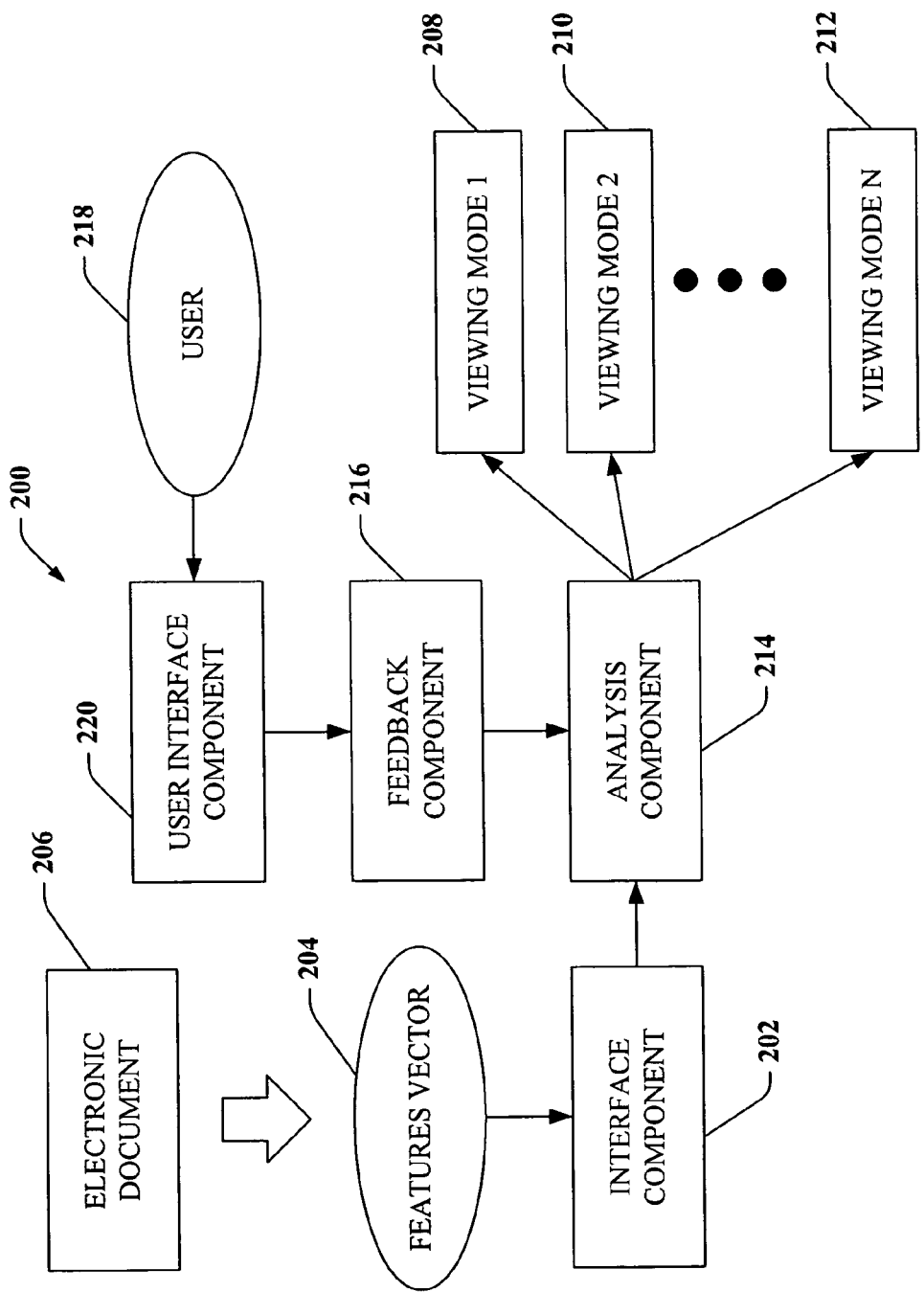
FIG. 2 is a block diagram of a system that facilitates automatic selection of a viewing mode in which to graphically render an electronic document based at least in part upon user feedback in accordance with an aspect of the subject invention.

Now referring to FIG. 2, a system 200 that facilitates determining a viewing mode in which to graphically render electronic documents is illustrated. The system 200 includes an interface component 202 that receives a features vector 204 relating to an electronic document 206. For example, the features vector 204 can include data relating to the electronic document 206 without requiring graphical rendering of the electronic document 206. In other words, data such as font style, size, spacing data (including tabs), and other data that can be determined from analyzing data associated with the electronic document 206 (without requiring rendering the electronic document 206) can be included within the features vector 204. Furthermore, data within the features vector 204 should not be superfluous; rather, such data should have an impact on readability associated with a plurality of viewing modes 208-212. The plurality of viewing modes 208-212, for example, can relate to a mode for viewing an electronic document for reading, a mode for viewing an electronic document for editing, and any other suitable viewing mode.

The interface component 202 can be associated with an analysis component 214 that analyzes contents of the features vector 204 and determines which of the viewing nodes 208-212 to employ in connection with graphically rendering the electronic document 206. For example, the analysis component 214 can determine that the electronic document 206 will not display desirably in a viewing mode intended to enhance readability, and thus cause the electronic document 206 to be rendered in a disparate viewing mode (e.g., a conventional viewing mode).

The system 200 can further include a feedback component 216 that enables a user 218 to provide information to the analysis component 214 regarding the electronic document 206 as it is displayed in one or more of the viewing modes 208-212. As described with respect to FIG. 1, annotators can be utilized in connection with training the analysis component 214. In some instances, however, whether a viewing mode sufficiently displays an electronic document can be a matter of opinion. In other words, the user 218 may in some instances believe that disparate views should be employed than what is selected by the analysis component 214. The user 218 can thus customize the analysis component 214 by providing information to the analysis component 214 by way of the feedback component 216. For instance, the feedback component 216 can provide the user 218 with questions relating to whether the viewing mode currently displaying the electronic document 206 is adequate, and the user 218 can answer such questions by way of a user interface component 220 (such as a keyboard, mouse, voice recognition hardware/software, and the like). In another example, the user 218 can be shown the electronic document 206 by way of two or more different viewing modes, and the user 218 can select which of the viewing modes best displays the electronic document by way of the user interface component 220 and the feedback component 216. The analysis component 214 can be updated in accordance with the information provided by the user 218. Therefore, the system 200 can be customized to perform in accordance with user preferences.

Figure 3:
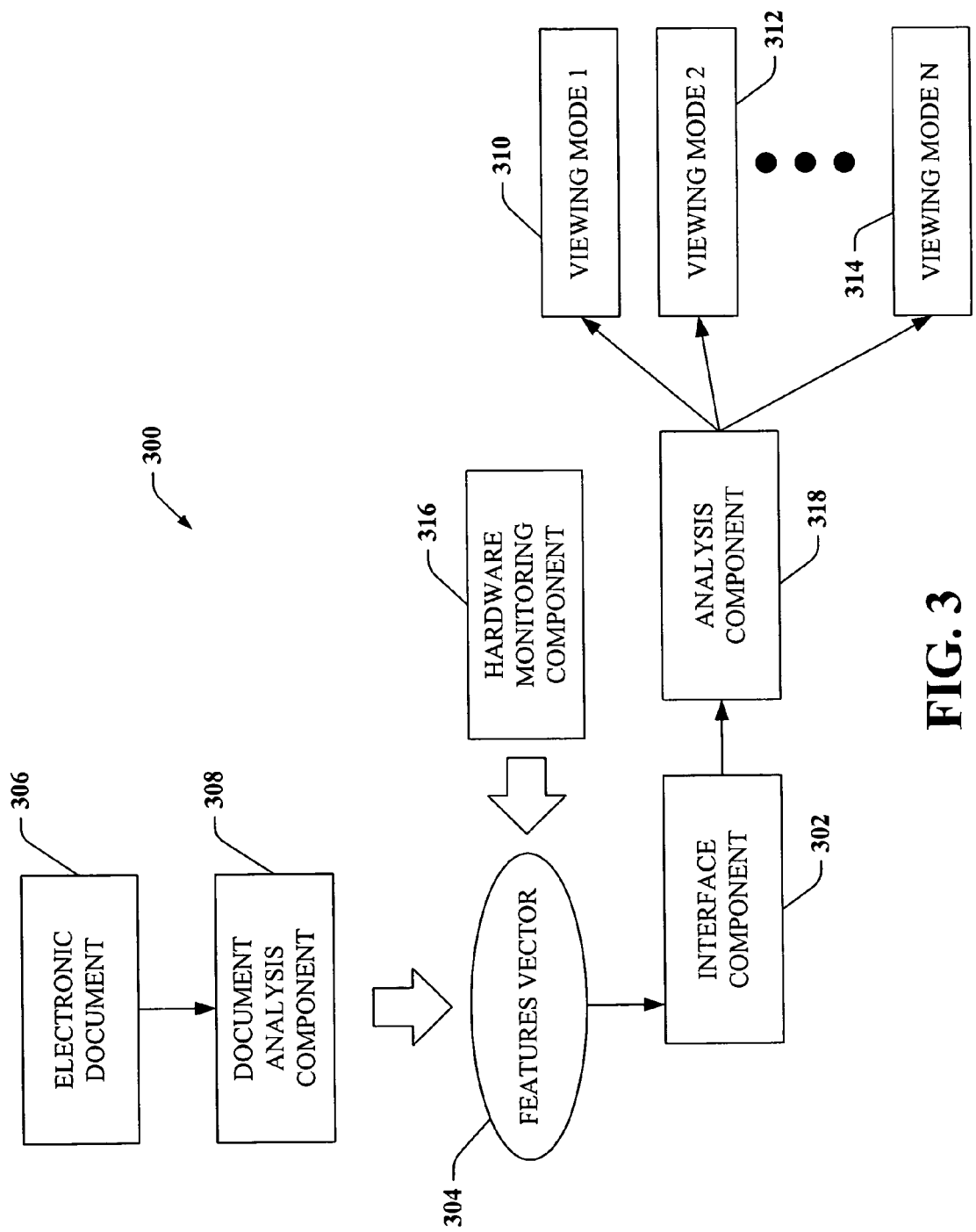
FIG. 3 is a block diagram of a system that facilitates automatic selection of a viewing mode in which to graphically render an electronic document based at least in part upon hardware parameters in accordance with an aspect of the subject invention.

Turning now to FIG. 3, a system 300 that facilitates selecting viewing modes in which to display electronic documents within a word processing application is illustrated. The system 300 includes an interface component 302 that receives a features vector 304, wherein the features vector 304 relates to an electronic document 306. A document analysis component 308 reviews the electronic document 306 and extracts particular data from therein to populate the features vector 304. For instance, the document analysis component 308 can determine a number of tabs within lines, a font style, size, and the like, and populate the features vector 304 with such information. As described above, the document analysis component 308 can extract data that is related to a manner in which the electronic document 306 will be displayed in a plurality of viewing modes 310-314.

The system 300 also includes a hardware monitoring component 316 that monitors hardware on a device (not shown) upon which the electronic document 306 will be displayed. For instance, disparate screens can cause viewing modes to display documents differently. More particularly, a hand-held device displaying the electronic document 306 may output such electronic document 306 differently than output by a conventional desktop computer display. Furthermore, display screens with different resolution and/or DPI can cause viewing modes to output the electronic document 306 in drastically disparate manners. Accordingly, the hardware monitoring component 316 can determine parameters such as screen size, resolution, and the like and populate the features vector 304 with such data. The system 300 further includes an analysis component 318 that is communicatively coupled to the interface component 302. The interface component 302 can relay the features vector 304 to the analysis component 318, which can then automatically select a viewing mode in which to display the electronic document 306. For instance, the analysis component 318 can determine that the viewing mode 310 is the optimal viewing mode to display the electronic document 306 based at least in part upon data within the features vector 304.

Figure 4:
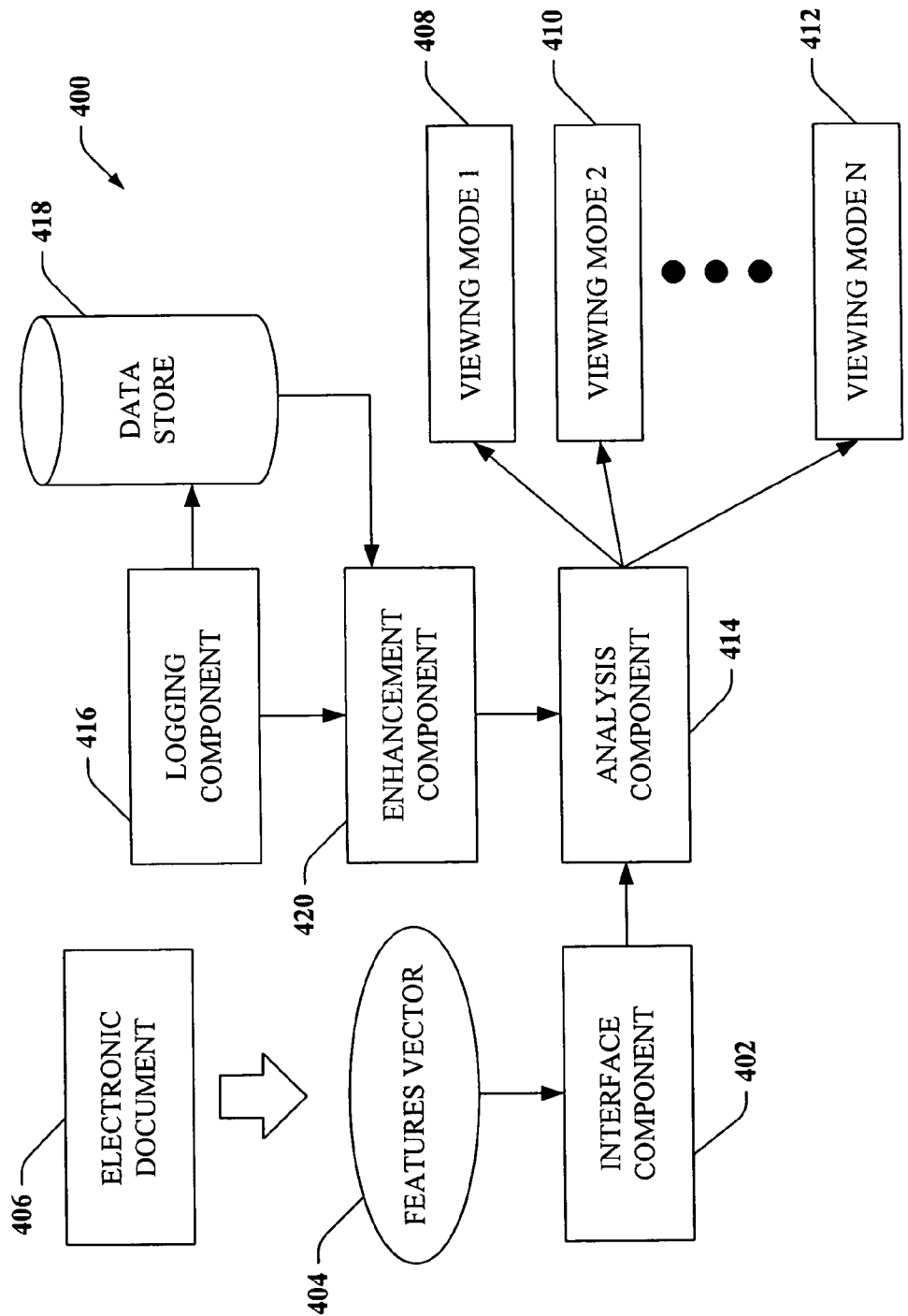
FIG. 4 is a block diagram of a system that facilitates automatic selection of a viewing mode in which to graphically render an electronic document based at least in part upon logged user actions in accordance with an aspect of the subject invention.

Now turning to FIG. 4, a system 400 that facilitates automatic selection of a viewing mode in which to display an electronic document is illustrated. The system 400 includes an interface component 402 that receives a features vector 404, wherein the features vector 404 relates to an electronic document 406. It is understood that the electronic document 406 is viewed and edited within a word processing application, which can comprise the system 400. As described above, the features vector 404 includes data associated with the electronic document 406 that relates to a manner in which the electronic document 406 will be displayed within a plurality of view modes 408-412. The interface component 402 can relay the features vector 404 to an analysis component 414 that automatically selects a viewing mode from the plurality of viewing modes 408-412 in which to graphically render the electronic document 406. For example, the analysis component 414 can determine that the electronic document 406 should be graphically rendered in the viewing mode 408 rather than other available viewing modes. In one particular example, the analysis component 414 can determine whether or not the electronic document 406 should be displayed in a viewing mode that is designed to assist a user in reading the electronic document 406 on a computer screen.

The system 400 can further include a logging component 416 that logs user activity with respect to the viewing modes 408-412. For instance, the logging component 416 can log actions relating to when a user switches between viewing modes 408-412 as well as data associated with electronic documents that are the subject of such switches. A data store 418 associated with the logging component 416 can store information logged by the logging component 416. An enhancement component 420 can analyze data within the data store 418 logged by the logging component 416 and automatically update the analysis component 414. For instance, over time, a user's actions can indicate personal preferences relating to manners in which electronic documents are graphically rendered. More specifically, logged actions and data can be indicative of viewing modes in which a user prefers to view documents given data associated with such documents. Thus, rather then requesting information from a user, the logging component 416 and the enhancement component 420 facilitate customization of the system 400 without explicitly requesting information from a user.

Figure 5:
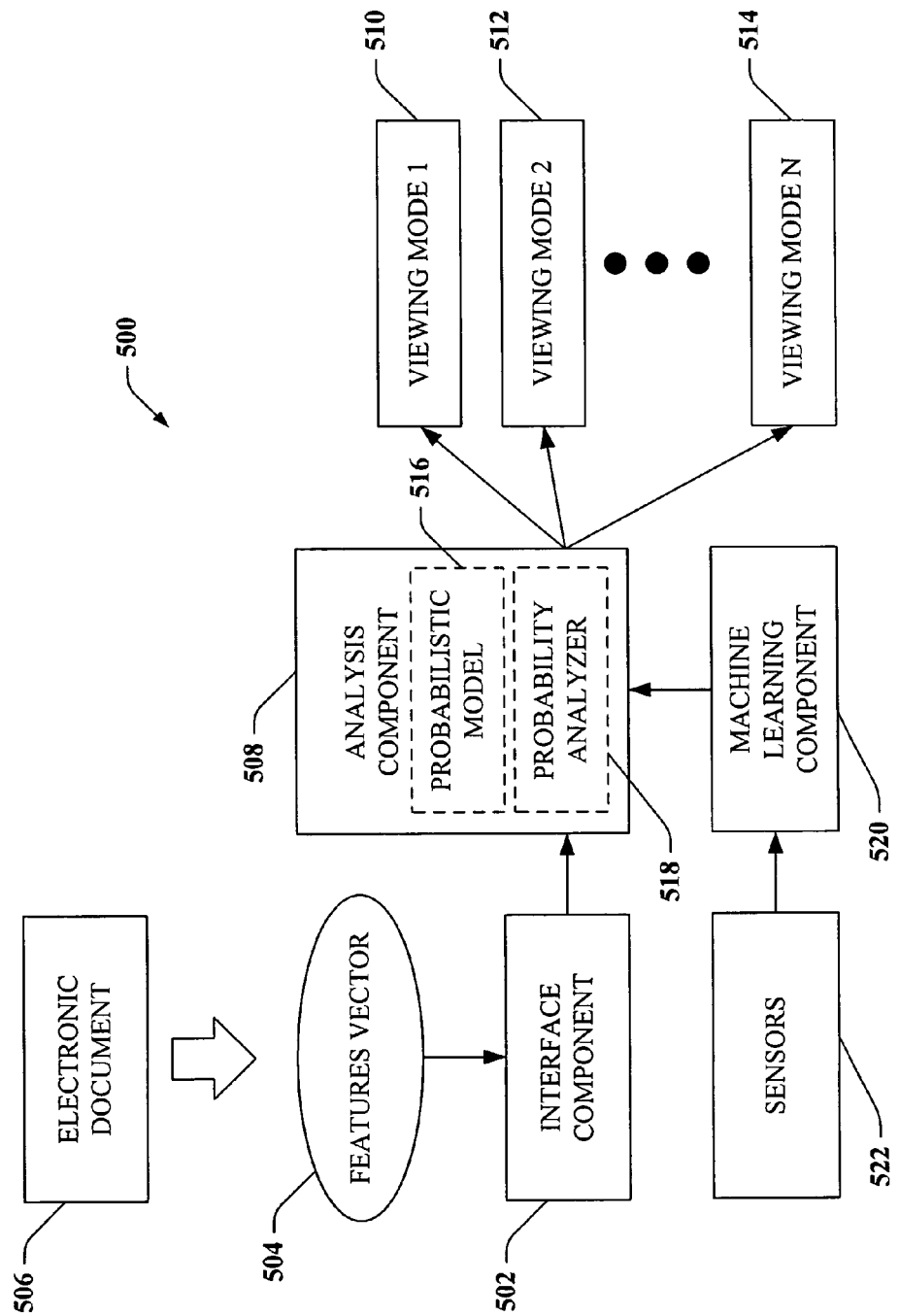
FIG. 5 is a block diagram of a system that facilitates automatic selection of a viewing mode in which to graphically render an electronic document in accordance with an aspect of the subject invention.

Now referring to FIG. 5, a system 500 that facilitates automatic selection of a viewing mode in which to display an electronic document. The system 500 includes an interface component 502 that receives a features vector 504 relating to an electronic document 506. An analysis component 508 is communicatively coupled to the interface component 502 and automatically determines one of a plurality of viewing modes 510-514 in which to graphically render the electronic document 506. In accordance with one aspect of the subject invention, the analysis component 508 can include a probabilistic model 516, such as a Bayesian belief network, to aid in determining a viewing mode in which to render the electronic document 506. Probabilistic models can utilize graphs in which nodes represent random variables and arcs (or lack thereof) represent conditional independence assumptions. In other words, the graphs can represent a compact representation of joint probability distributions. Undirected graphical models, also called Markov Random Fields (MRFs) or Markov networks, have a simple definition of independence: two (sets of) nodes A and B are conditionally independent given a third set, C, if all paths between the nodes in A and B are separated by a node in C. Directed graphical models, also called Bayesian Networks or Belief Networks (BNs), have a more complicated notion of independence, which takes into account the directionality of arcs. While described as probabilistic models, it is understood that the analysis component 508 can employ any suitable mechanism for determining a viewing mode in which to render the electronic document 506 is contemplated by the inventors of the subject invention and intended to fall under the scope of the hereto-appended claims.

The analysis component 508 further includes a probability analyzer 518 that analyzes probabilities of decisions output by the analysis component 508. For instance, the probabilistic model 516 can determine that particular probabilities exist with respect to desirability of rendering the electronic document 506 in each of the plurality of viewing modes 510-514. The probability analyzer 518 can analyze such probabilities and enable selection of a viewing mode associated with a highest probability. The system 500 can further include a machine-learning component 520 that is associated with the analysis component 508, wherein the machine-learning component 520 can generate inferences relating to determination of a viewing mode selection associated with the electronic document 506.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention. Referring to selection of a viewing mode, users can consciously or subconsciously desire disparate viewing modes for similar electronic documents depending on contextual data.

More specifically, a user may wish to view a document in one viewing mode in the morning and in a different viewing mode in the evening. The machine-learning component 520 can analyze user history, user context, and other suitable contextual data and to assist in calculating probabilities associated with desirability of rendering the electronic document 506 in the plurality of viewing modes 510-514. Furthermore, the system 500 can be associated with sensors 522 that aid in collection of contextual data, such as time of day, day of week, geographic location, whether the user is currently in motion (e.g., in an automobile), etc. The machine-learning component 520 can review such data and communicate with the analysis component 508 to assist in selecting one of the viewing modes 510-514 in which to render the electronic document 506.

Figure 6:
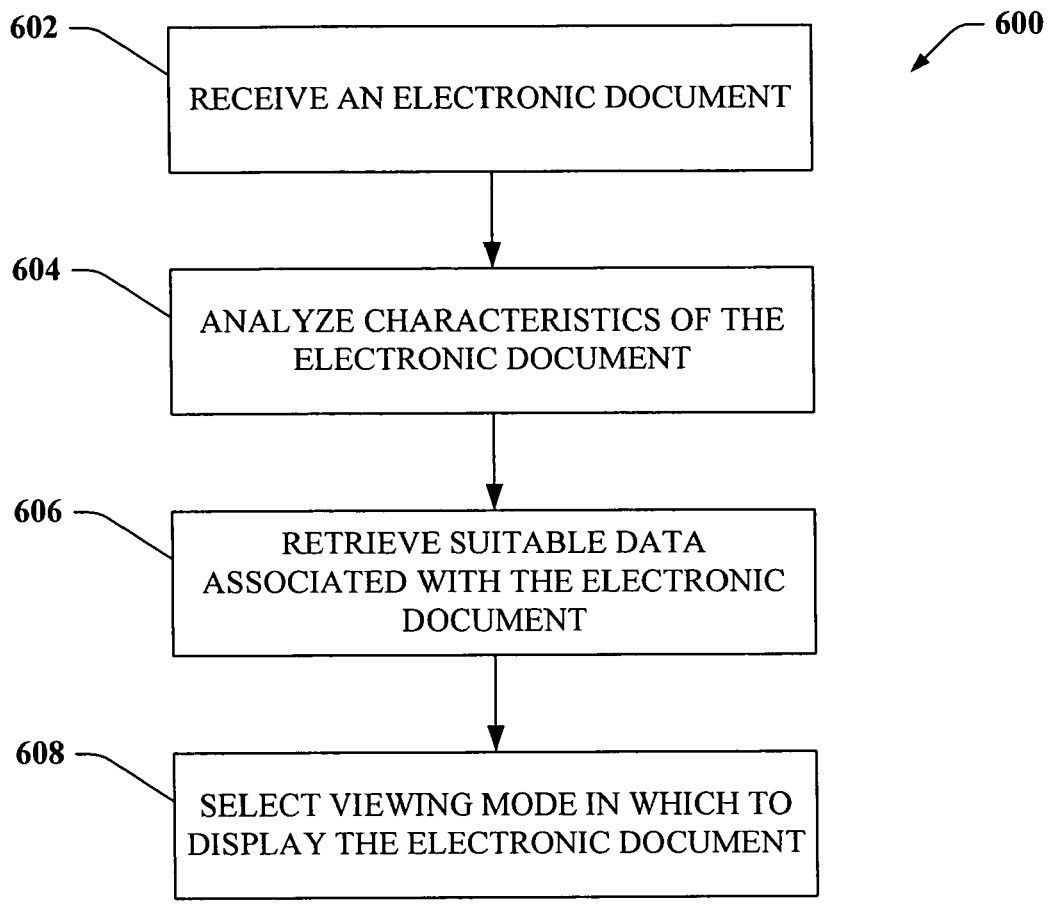
FIG. 6 is a representative flow diagram illustrating a methodology for selecting a viewing mode in which to display an electronic document in accordance with an aspect of the subject invention.
Figure 7:
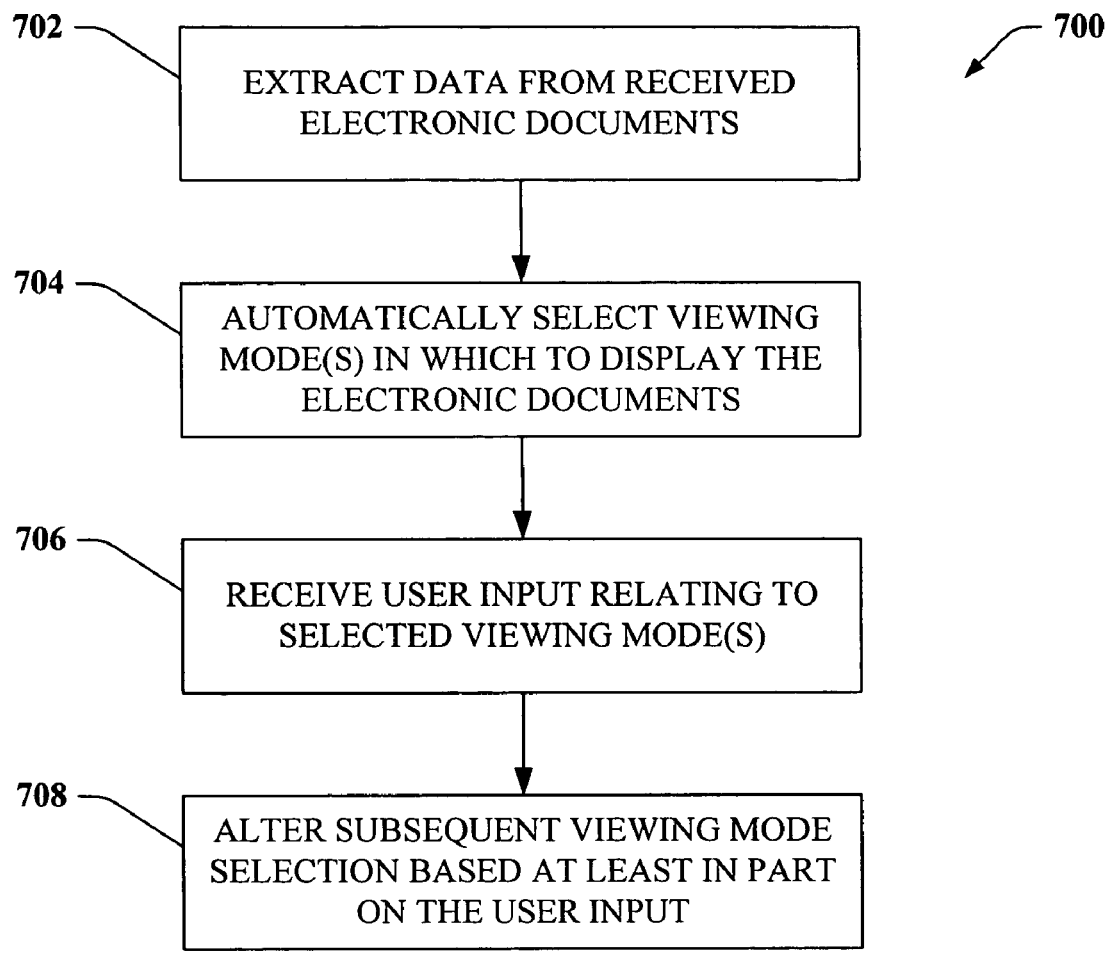
FIG. 7 is a representative flow diagram illustrating a methodology for automatically selecting a viewing mode in which to display an electronic document based at least in part upon user feedback in accordance with an aspect of the subject invention.
Figure 8:
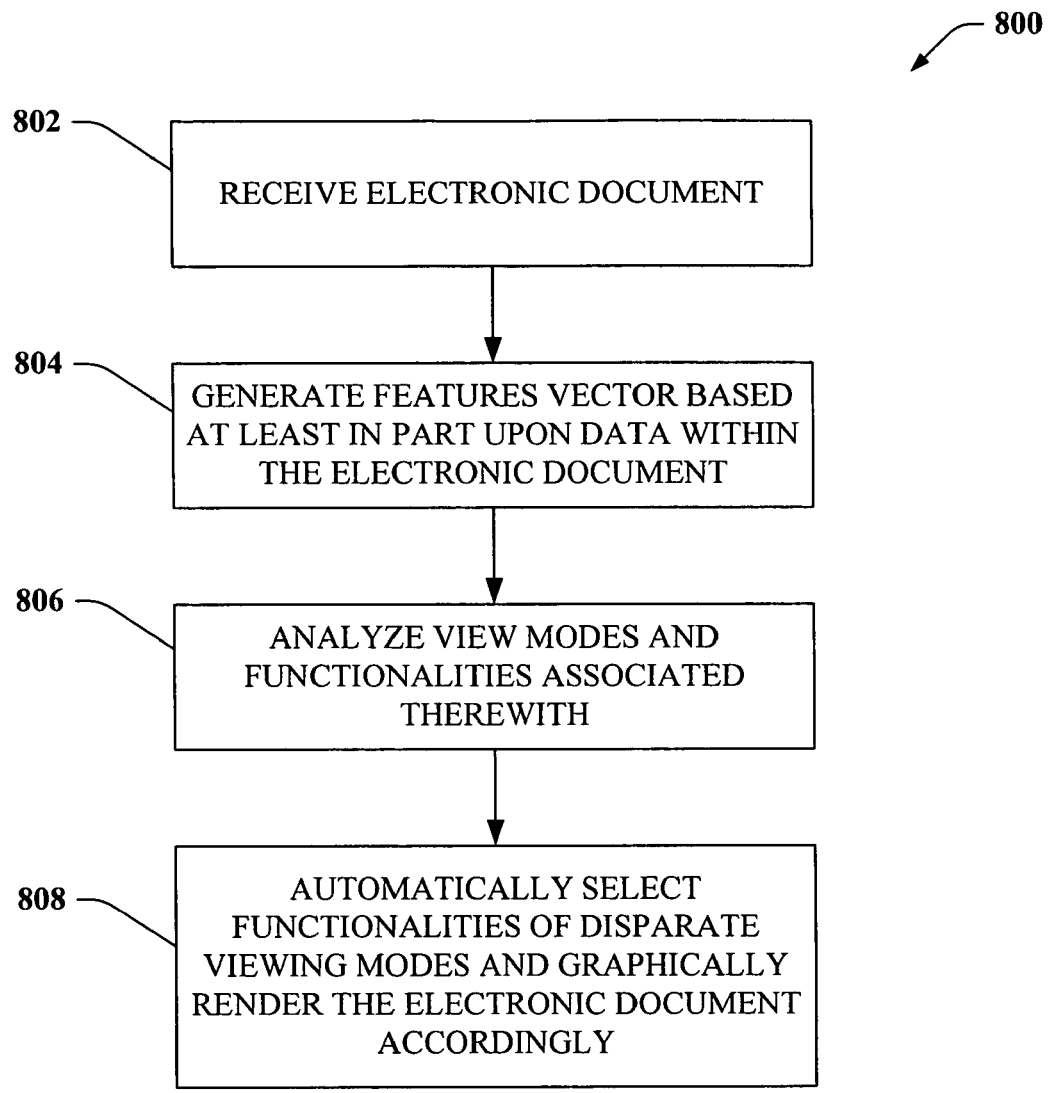
FIG. 8 is a representative flow diagram illustrating a methodology for generating a customized viewing mode in which to display an electronic document in accordance with an aspect of the subject invention.

Referring now to FIGS. 6-8, methodologies in accordance with the subject invention will now be described by way of a series of acts. It is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning solely to FIG. 6, a methodology 600 for automatically selecting a viewing mode in which to graphically render an electronic document is illustrated. At 602, an electronic document is received. For instance, reception of the electronic document can relate to selection of a file to open the document from a file folder or the like. Similarly, reception of the electronic document can be associated with opening the electronic document from an email application or the like. At 604, characteristics of the electronic document are analyzed. Such characteristics can be discerned by analyzing data associated with the electronic document—therefore, there is no need to graphically render the electronic document prior to selecting a viewing mode. For example, the characteristics can relate to whether bullets exist within the document, whether the document includes an outline format, number of tabs on disparate lines, and the like.

At 606, suitable data such as that described above is retrieved from the electronic document. As described herein, the data retrieved from the electronic document should in some manner relate to how the electronic document will be rendered within one or more viewing modes. The retrieved data can be packaged in any suitable manner; for instance, the data can be places in a vector format, a matrix format, and the like. At 608, a viewing mode in which to display the electronic document is selected. In accordance with one aspect of the subject invention, the selected viewing mode can be particularly designed for reading and reviewing the electronic document on a computer screen. In another example, the selected viewing mode can be designed for document creation and editing, and can conform to a style in which the electronic document will be generated upon printing.

Turning now to FIG. 7, a methodology 700 for automatically selecting a viewing mode from a plurality of viewing modes in which to display an electronic document upon a computer screen is illustrated. At 702, data is extracted from an electronic document upon user-selection of such document, and at 704, a viewing mode in which to display the electronic document is automatically selected. At 706, user input relating to the selected viewing mode is received. For instance, a user can indicate that certain portions of the electronic document are not displayed desirably within the selected viewing modes. Further, the user can provide information relating solely to preference, such as requesting that all electronic documents that include outlined format be presented in a particular viewing mode, selecting that documents be rendered in a particular viewing mode at certain times of day or days of a week, etc. Thus, the user can provide any suitable input relating to customization of selection of viewing modes.

At 708, subsequent selection of viewing modes is altered based at least in part upon the received user input. Thus, for example, if the user specified that they wished to view documents including outlining format in a particular viewing mode, thereafter such request would be implemented (e.g., each document including outline format would be displayed in the viewing mode specified by the user). Similarly, if the user specified that they desired to view all documents at certain times of day within particular viewing modes, subsequent documents would be rendered accordingly.

Now turning to FIG. 8, a methodology 800 for customizing a viewing mode in which to render an electronic document is illustrated. At 802, an electronic document is received, and at 804, a features vector is generated based at least in part upon data within the electronic document. At 806, viewing modes and functionalities associated therewith are analyzed in accordance with the generated features vector. For example, disparate viewing modes can be associated with specific functionality, such as functionality enhancing readability, functionality associated with enhanced reviewing, and the like. While the viewing modes can be associated with a plurality of disparate functionalities, in some instances one designed viewing mode may not meet needs of a user. Combination of functionalities between disparate viewing modes, however, may sufficiently satisfy user needs with respect to viewing the document. Accordingly, at 808, functionalities of disparate viewing modes are automatically selected, and the electronic document is graphically rendered accordingly. In other words, a customized viewing mode can be generated for each received electronic document, wherein functionalities are selected based at least in part upon analysis of content of the features vector.

Figure 9:
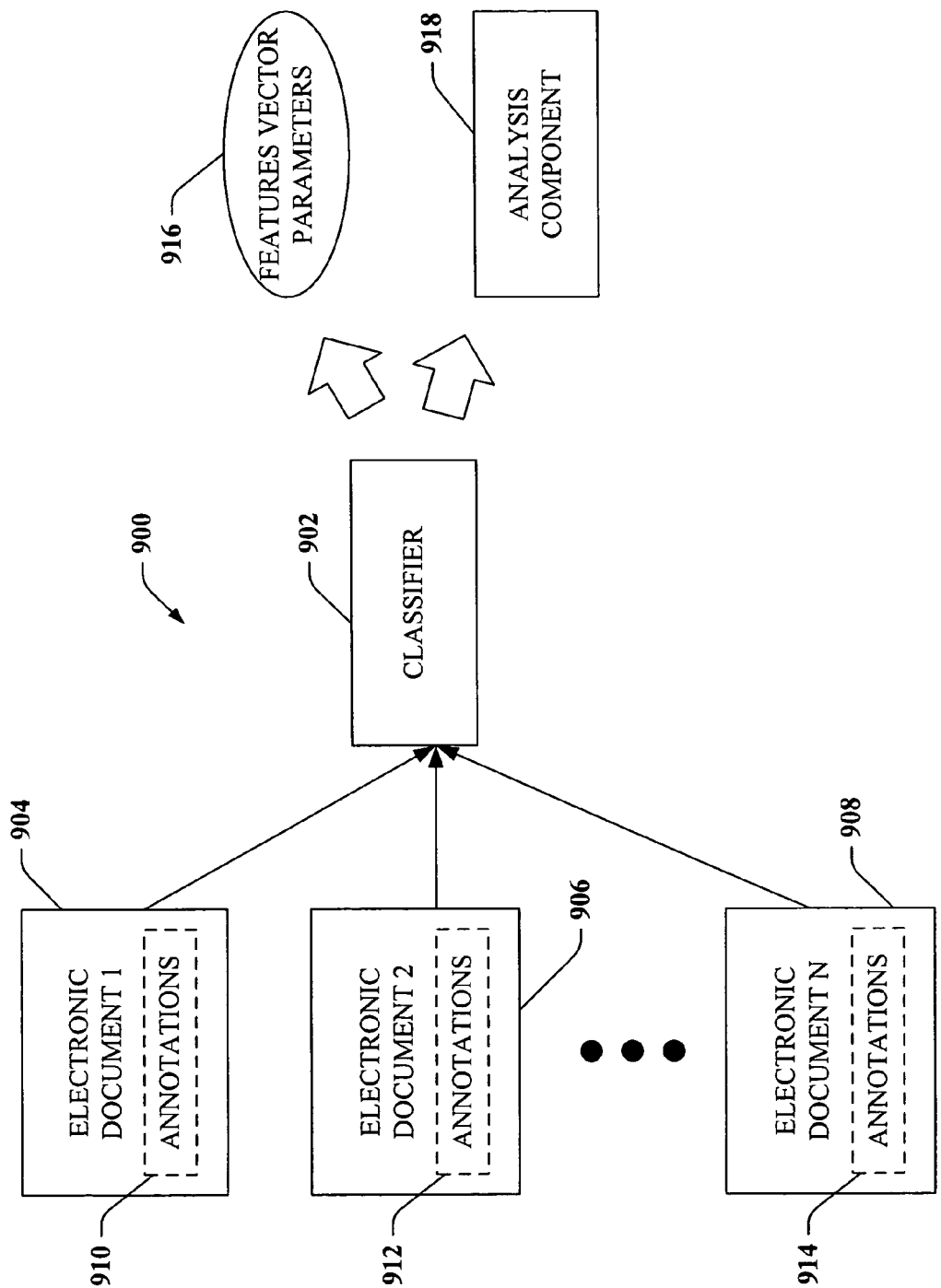
FIG. 9 is a block diagram of a system that facilitates training a classifier to aid in selecting viewing modes in which to display electronic documents in accordance with an aspect of the subject invention.

Turning now to FIG. 9, a system 900 that facilitates determining characteristics of electronic documents to include in a features vector as well as constructing an analysis component (as described in FIGS. 1-5) is illustrated. The system 900 includes a classifier 902 that receives a plurality of electronic documents 904-908 and annotations 910-914 associated therewith. For instance, the plurality of electronic documents 904-908 can be provided to annotators who each review at least a subset of the electronic documents 904-908 in disparate viewing modes. The annotators can indicate which of the electronic documents 904-908 is best suited for particular viewing modes, and can provide further information relating to which features/characteristics of the electronic documents 904-908 are problematic within disparate viewing modes.

With more detail relating to the classifier 902, such classifier 902 can be a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed in connection with the system 900. SVMs operate by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Further, a combination of classifiers can also be employed in accordance with an aspect of the subject invention, whereby results produced by individual classifiers are combined by way of techniques such as boosting. Thus, it is understood that any suitable machine learning technique(s) or combination thereof can be employed in accordance with one or more features of the subject invention.

Upon the classifier 902 being trained by the electronic documents 904-908 (and the annotations 910-914 therein), parameters relating to electronic documents that are of importance when graphically rendering documents can be derived. In other words, features vector parameters 916 can be determined upon training of the classifier 902. Furthermore, an analysis component 918 (similar to the analysis components described in FIGS. 1-5) can be created based at least in part upon the trained classifier 902. Thus, when determining a viewing mode in which to render an electronic document, the analysis component 918 can analyze a features vector associated with the document and determine a best available viewing mode for the electronic document.

Figure 10:
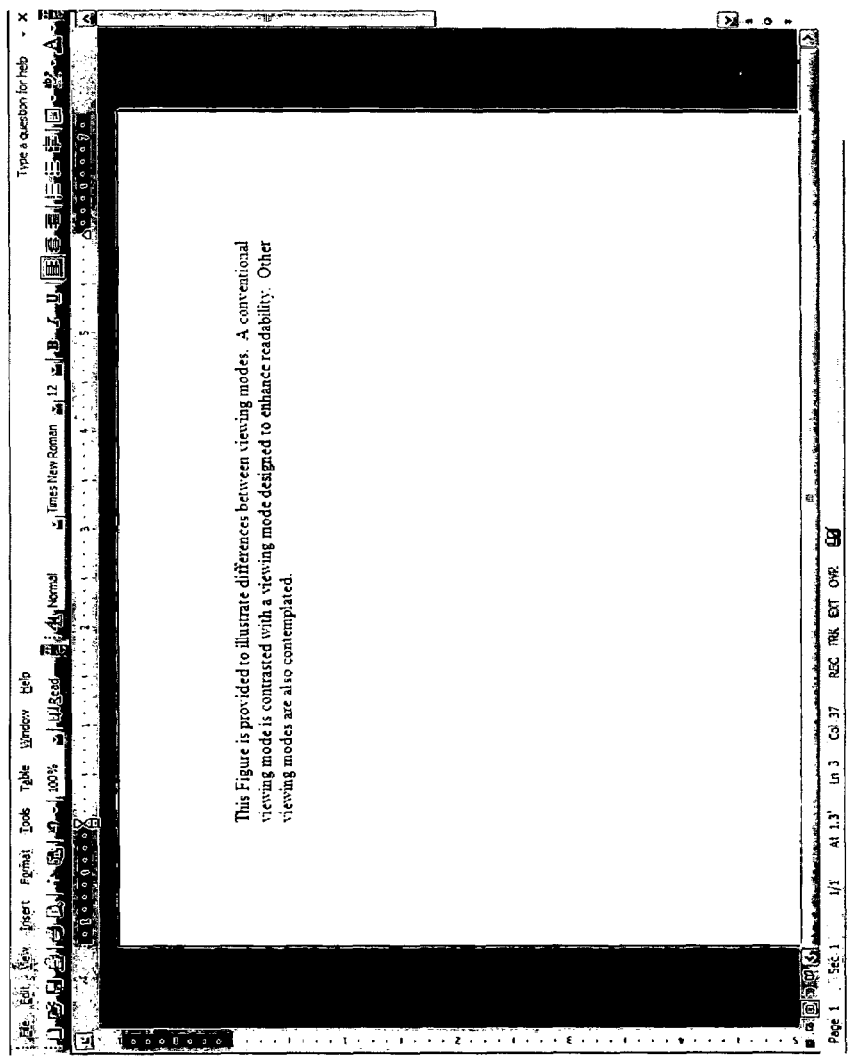
FIGS. 10 and 11 are screenshots illustrating disparate viewing modes that can be selected in accordance with the subject invention.
Figure 11:
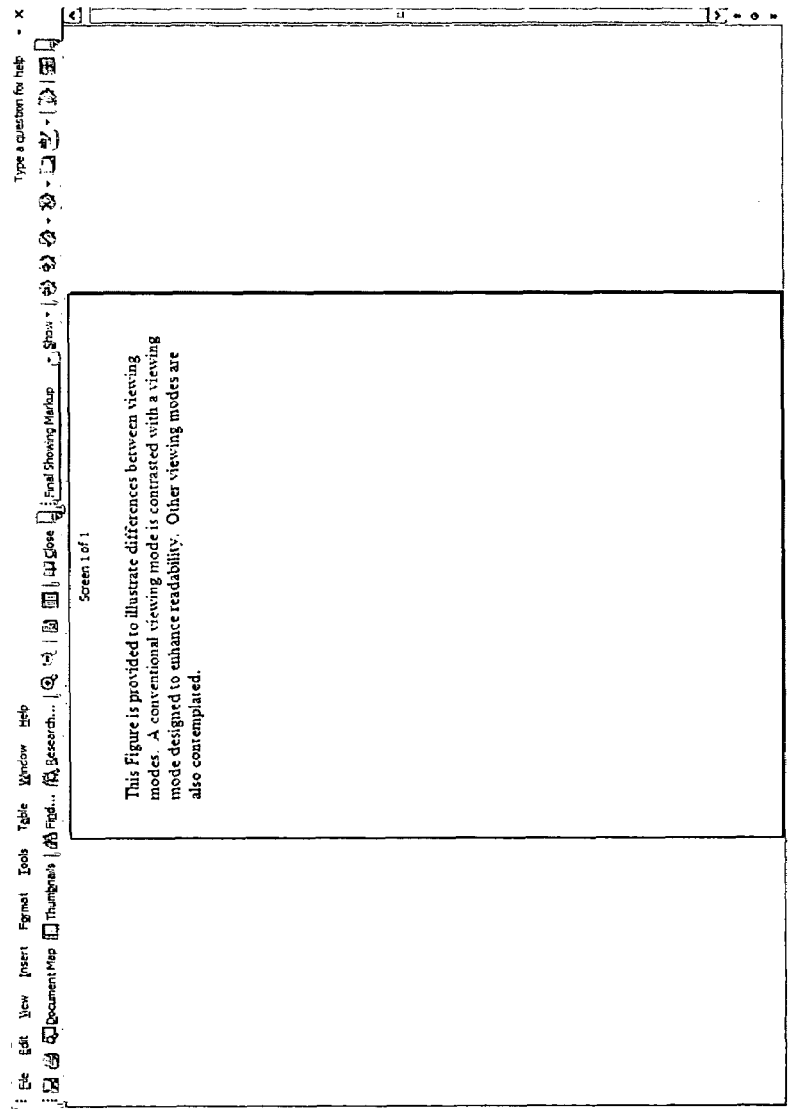

Referring collectively to FIGS. 10 and 11, screenshots 1000 and 1100 of two disparate viewing modes that can be employed to graphically render an electronic document are illustrated. Turning solely to FIG. 10, the screenshot 1000 exemplifies a conventional viewing mode often employed for creating and editing electronic documents. While the viewing mode is sufficient for such tasks, it may not be optimal for readability and review of such document. Now referring to FIG. 11, the screenshot 1100 exemplifies a viewing mode that is utilized for improved readability of an electronic document. Further, the viewing mode illustrated within the screenshot 1100 can be beneficial in connection with a reader reviewing such document (e.g., providing comments).

Figure 12:
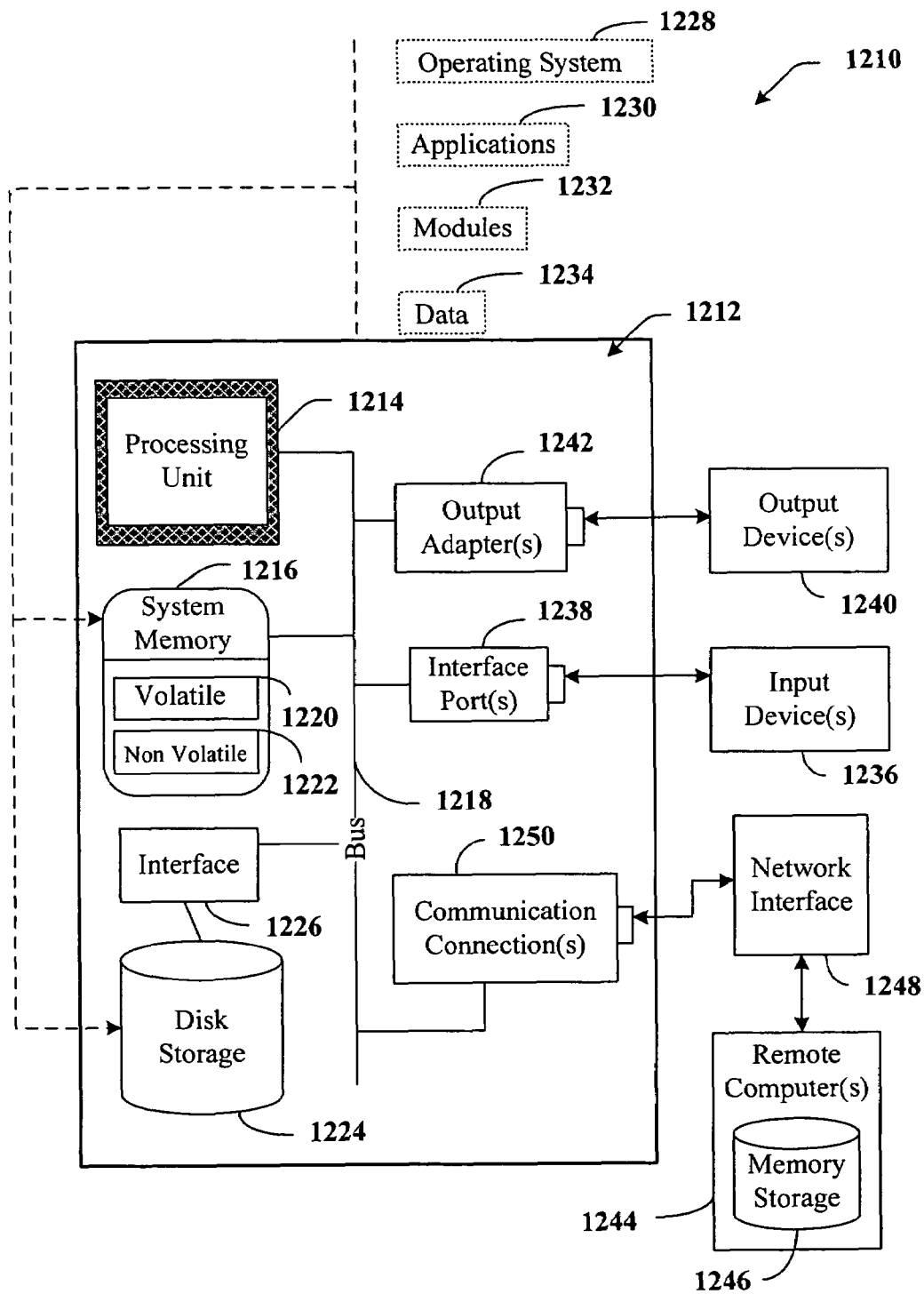
FIG. 12 illustrates an exemplary operating environment that can be employed in accordance with the subject invention.

In order to provide additional context for various aspects of the subject invention, FIG. 12 and the following discussion are intended to provide a brief, general description of a suitable operating environment 1210 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
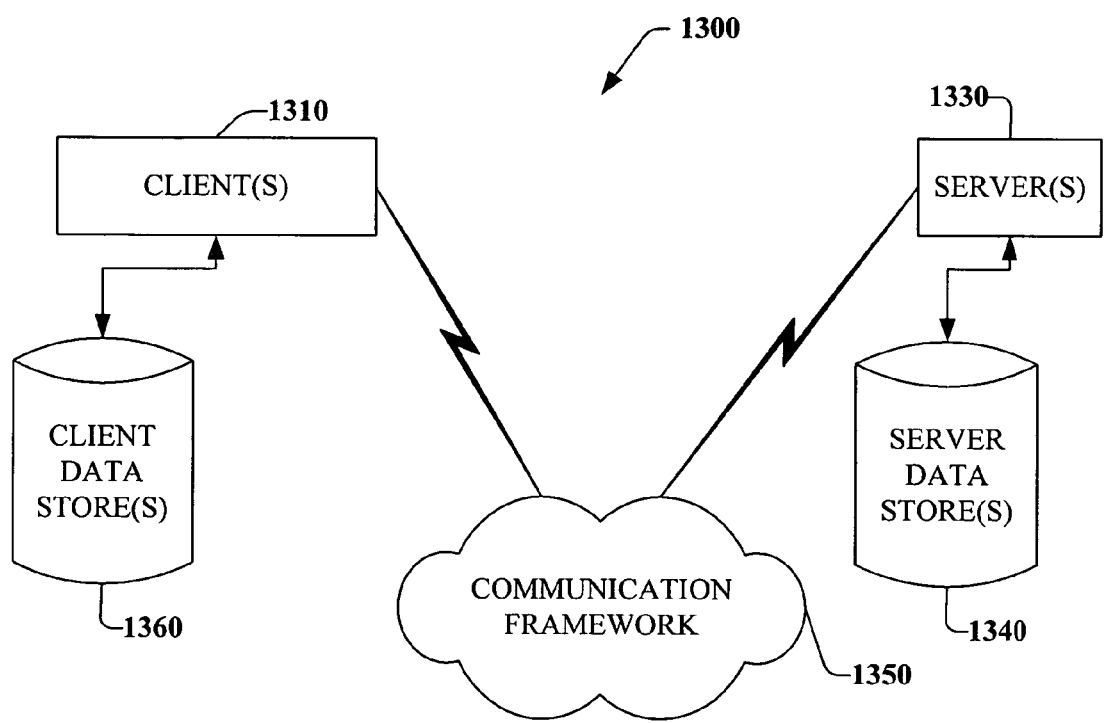
FIG. 13 illustrates an exemplary networking environment, wherein the novel aspects of the subject invention can be employed.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A word processing system, comprising:
    a document analysis component that analyzes an electronic document and generates a features vector based upon the analysis;
    an interface component that receives the features vector associated with the electronic document, wherein the features vector comprises data relating to at least one of a font style associated with the electronic document, or a font size associated with the electronic document, or spacing data associated with the electronic document;
    an analysis component communicatively coupled to the interface component, the analysis component analyzes the data in the features vector and automatically determines a viewing mode from among two or more different available viewing modes in which to display the electronic document based on the analyzed data in the features vector; and
    a processor that facilitates executing instructions associated with the system.

2. The system of claim 1, wherein the viewing mode is one of a conventional viewing mode and a viewing mode associated with enhanced readability.

3. The system of claim 1, wherein the analysis component includes at least one of a Bayesian model that is at least partially populated with data within the features vector, a support vector machine, a boosting classifier, a neural network, or a combination of classifiers.

4. The system of claim 1, further comprising a feedback component that receives user input regarding the viewing mode.

5. The system of claim 4, wherein the analysis component is updated based at least in part upon the user input received by the feedback component.

6. The system of claim 1, wherein the features vector further comprises data relating to at least one of pointers within the electronic document or structure of the electronic document.

7. The system of claim 1, further comprising a hardware monitoring component that analyzes hardware associated with a device in which the electronic document is going to be displayed, the features vector includes data relating to the analysis.

8. The system of claim 1, further comprising a logging component that logs data relating to user review of a plurality of electronic documents, wherein the data comprises actions undertaken by a user with respect to altering viewing modes associated with the plurality of electronic documents and further logs data relating to parameters of the plurality of electronic documents.

9. The system of claim 8, further comprising an enhancement component that automatically updates the analysis component based at least in part upon the data logged by the logging component.

10. The system of claim 1, wherein the analysis component is associated with a machine-learning component that generates inferences relating to viewing modes based at least in part upon one or more of user history, user context, or associated contextual data.

11. The system of claim 1, further comprising an updating component that receives updates relating to the analysis component from a service provider by way of a network and updates the analysis component in accordance with the received updates.

12. The system of claim 1, further comprising a modification component that at least temporarily modifies structure of the electronic document so that it can be viewed in a particular viewing mode.

13. The system of claim 1, wherein the analysis component comprises a probability determining component that selects a viewing mode based at least in part upon a calculated probability that the viewing mode is a desirable viewing mode.

14. A computer-implemented method for determining a viewing mode in which to display an electronic document, comprising:
    receiving an electronic document;
    extracting characteristics from data associated with the electronic document, the data relates at least in part to one or more of a font style associated with the electronic document, or a font size associated with the electronic document, or spacing data associated with the electronic document;
    generating a features vector that is populated with the extracted characteristics;
    analyzing the features vector and automatically selecting one of at least two different available viewing modes within a word processing system in which to display the electronic document, the selection is based on the characteristics in the analyzed features vector; and
    associating the selection with the electronic document, the associated selection facilitates displaying the electronic document or at least one other electronic document in the selected viewing mode.

15. The method of claim 14, further comprising monitoring user activity over a period of time to determine which characteristics to extract from the data.

16. The method of claim 14, further comprising:
    receiving user input relating to the electronic document; and
    automatically selecting one of at least two viewing modes relating to a subsequent electronic document.

17. The method of claim 14, further comprising:
    receiving commands from a user relating to altering the selected viewing mode; and
    altering the viewing mode in accordance with the commands.

18. A viewing mode selection system, comprising:
    means for extracting data associated with an electronic document, the data relates at least in part to one or more of a font style associated with the electronic document, or a font size associated with the electronic document, or spacing data associated with the electronic document;
    means for generating a features vector that is populated with the extracted data:
    means for analyzing the data in the features vector and automatically selecting a viewing mode from among two or more different available viewing modes in which to display the electronic document in a word processing system based on the analyzed data in the features vector; and
    means for executing instructions associated with the system.

* * * * *